US012482033B2

(12) United States Patent
Kingston

(10) Patent No.: US 12,482,033 B2
(45) Date of Patent: Nov. 25, 2025

(54) SYSTEMS AND METHODS FOR INTEGRATED MARKETING

(71) Applicant: Joseph Peter Kingston, Taylorsville, UT (US)

(72) Inventor: Joseph Peter Kingston, Taylorsville, UT (US)

(*) Notice: Subject to any disclaimer, the term of this patent is extended or adjusted under 35 U.S.C. 154(b) by 0 days.

(21) Appl. No.: 17/751,530

(22) Filed: May 23, 2022

(65) Prior Publication Data

US 2022/0385992 A1    Dec. 1, 2022

Related U.S. Application Data

(63) Continuation of application No. 16/698,370, filed on Nov. 27, 2019, now Pat. No. 11,341,567.

(60) Provisional application No. 62/772,793, filed on Nov. 29, 2018.

(51) Int. Cl.
| | |
|---|---|
| *G06Q 30/0601* | (2023.01) |
| *G06N 3/02* | (2006.01) |
| *G06Q 30/02* | (2023.01) |
| *G06Q 30/0241* | (2023.01) |
| *G06V 10/764* | (2022.01) |
| *G06V 20/40* | (2022.01) |
| *H04N 21/81* | (2011.01) |

(52) U.S. Cl.
CPC ......... *G06Q 30/0643* (2013.01); *G06N 3/02* (2013.01); *G06Q 30/02* (2013.01); *G06Q 30/0241* (2013.01); *G06V 10/764* (2022.01); *G06V 20/41* (2022.01); *H04N 21/8126* (2013.01)

(58) Field of Classification Search
CPC ............... G06Q 30/0643; G06Q 30/02; G06Q 30/0241; G06V 20/41; G06V 10/764; G06N 3/02; H04N 21/8126
See application file for complete search history.

(56) References Cited

U.S. PATENT DOCUMENTS

| | | | | |
|---|---|---|---|---|
| 10,748,206 | B1* | 8/2020 | Cooper | ............... G06F 16/5866 |
| 11,589,128 | B1* | 2/2023 | Greiner | ............... G06Q 30/0633 |
| 2003/0172376 | A1 | 9/2003 | Coffin, III | |
| 2009/0006937 | A1* | 1/2009 | Knapp | ............... G06Q 30/0204 |
| | | | | 705/7.33 |
| 2010/0088726 | A1* | 4/2010 | Curtis | .................. G11B 27/034 |
| | | | | 725/45 |
| 2012/0036015 | A1 | 2/2012 | Sheikh | |
| 2012/0272278 | A1 | 10/2012 | Bedi | |
| 2013/0254802 | A1 | 9/2013 | Lax et al. | |

(Continued)

OTHER PUBLICATIONS

United States Patent and Trademark Office, "International Search Report", Jan. 14, 2020, International Application No. PCT/US2019/063723.

*Primary Examiner* — Beth V Boswell
(74) *Attorney, Agent, or Firm* — Travis Banta; Loyal IP Law, PLLC

(57) ABSTRACT

Systems, methods, and devices for integrated marketing are disclosed herein. An integrated marketing system may include an integrated marketing device receiving media content from a content provider device. The integrated marketing device attaches one or more product tags to the video content based on elements within the video content. The one or more attached product tags are provided to a consumer or to the content provider device for display on a consumer device.

9 Claims, 7 Drawing Sheets

(56) References Cited

U.S. PATENT DOCUMENTS

| | | | | |
|---|---|---|---|---|
| 2015/0170245 A1* | 6/2015 | Scoglio | .............. | G06Q 30/0623 |
| | | | | 705/14.55 |
| 2018/0025405 A1* | 1/2018 | Jones | ................. | G06Q 30/0643 |
| | | | | 705/26.7 |
| 2018/0032997 A1* | 2/2018 | Gordon | .............. | G06Q 30/0269 |

* cited by examiner

SYSTEMS AND METHODS FOR INTEGRATED MARKETING

PRIORITY CLAIMS

This application claims the benefit of U.S. Provisional Application No. 62/772,793, filed Nov. 29, 2018, which is incorporated herein by reference in its entirety, including but not limited to those portions that specifically appear hereinafter, the incorporation by reference being made with the following exception: In the event that any portion of the above-referenced provisional application is inconsistent with this application, this application supersedes said above-referenced provisional application.

TECHNICAL FIELD

The disclosure relates generally to systems, methods, and devices for integrated marking and particularly relates to systems, methods, and devices for integrating product tags in media content.

BACKGROUND

Significant time, resources, and efforts are expended by product and service providers to market, brand, advertise, and sell products or services to consumers in regional and global markets. Such marketing efforts can take many forms and commonly include video commercials or advertisements that play before or during various forms of media content. Consumers often do not appreciate video commercials because the commercial may be directed outside the consumer's interests, the commercial commonly interrupts the consumer's programming, and the commercial may irritate rather than inform the consumer. Many consumers have opted out of video commercials by paying additional fees to avoid advertisements, paying additional fees for a service that enables the consumer to skip advertisements, and/or opting into advertisement blocking programs. As such, manufacturers and retailers often waste significant resources generating and transmitting advertisements that consumers actively avoid.

Applicant herein discloses methods, systems, and devices for integrated marketing. Such methods, systems, and devices are directed to overlaying product tags on media content that may be viewed by a consumer. The consumer may elect to opt-in to the product tagging system in lieu of receiving traditional advertisements. Additionally, a provider of media content may permit a viewer to opt-out of viewing advertisements or may show product tagging depending on a subscription plan elected by the viewer. Additionally, the integrated marketing may be specialized to the interests of the consumer and may provide a better return for a provider of goods and/or services.

SUMMARY

An integrated marketing system is disclosed. An integrated marketing system may include an integrated marketing device receiving media content from a content provider device. The integrated marketing device attaches one or more product tags to the video content based on elements within the video content. The one or more attached product tags are provided to a consumer or to the content provider device for display on a consumer device.

A non-transitory computer readable storage medium is disclosed. The non-transitory computer readable storage medium may contain instructions which when executed by a processor cause the processor to perform a method. The method comprises receiving, by an integrated marketing device, media content from a content provider device. The method further comprises attaching, by the integrated marketing device, one or more product tags to the video content based on elements within the video content. The method further comprises providing, by the integrated marketing device, the one or more attached product tags to a consumer or to the content provider device for display on a consumer device.

Finally, a method is disclosed. The method includes receiving, by an integrated marketing device, media content from a content provider device. The method further comprises attaching, by the integrated marketing device, one or more product tags to the video content based on elements within the video content. The method further comprises providing, by the integrated marketing device, the one or more attached product tags to a consumer or to the content provider device for display on a consumer device.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
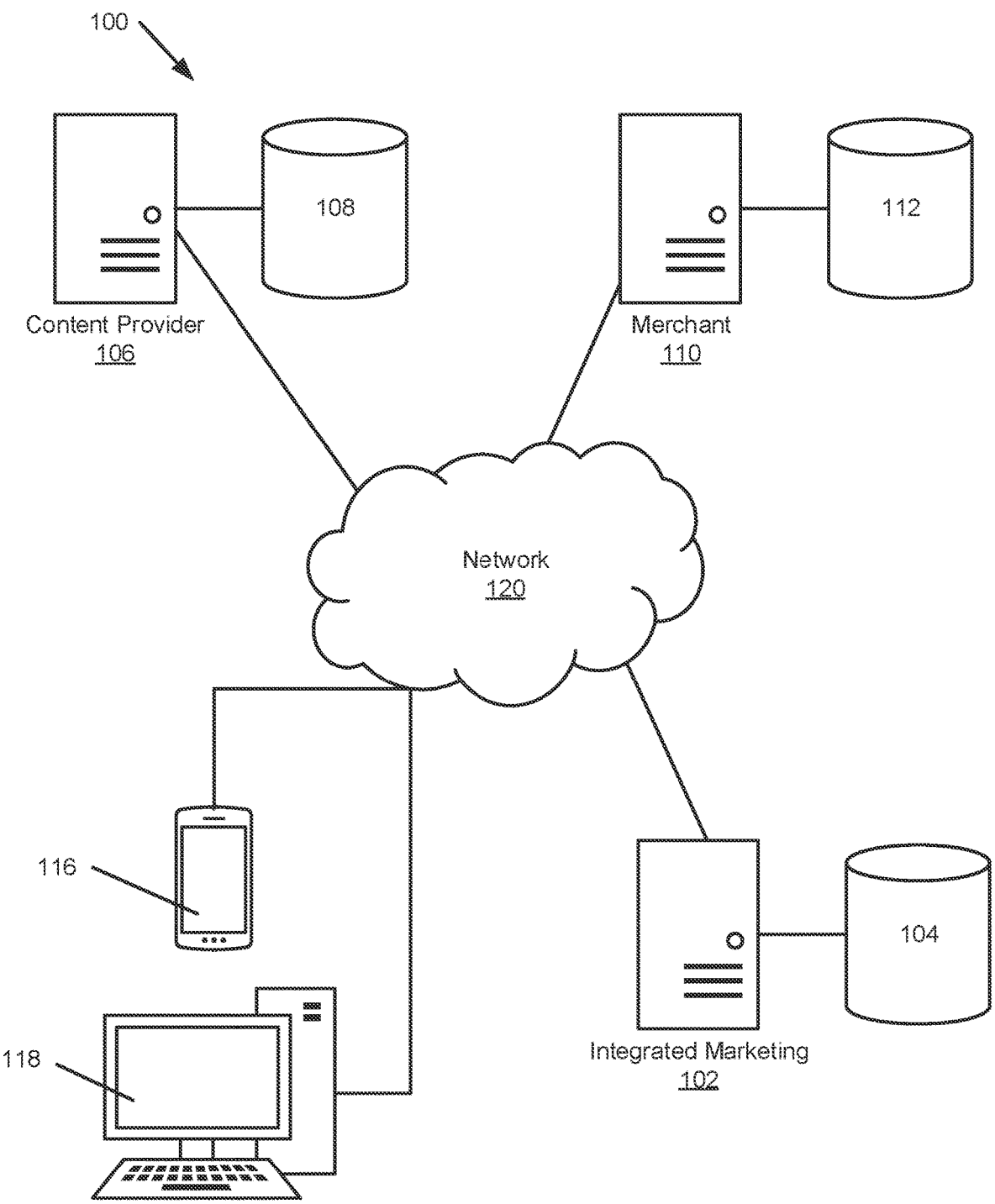
FIG. 1 illustrates a schematic diagram of a system for providing integrated marketing, according to an embodiment of the disclosure.

The present disclosure extends to systems, methods, and devices for integrated marketing. Marketing campaigns are an important aspect of a product or service provider's plan to provide and sell products to consumers. Such product and service providers may include manufacturers, brick-and-mortar retailers, online retailers, service providers, lenders, agents, and so forth that may operate in commerce to sell, lease, rent, advertise, or promote any good or service. Improvements in technology enable merchants to provide personalized marketing such that advertisements are provided only to those consumers that are more likely to be interested in the products. Such personalized marketing saves resources for those consumers who are more likely to make a purchase and is more cost-efficient than broad advertising methods. However, in instances of video media content, such as sporting events, television shows, and so forth, merchants are often left with transmitting video commercials to a broad audience that may include many consumers who are not interested in the advertised products. Such marketing is costly in terms of time, efforts, and money, and often returns a low percentage of sales for the money spent. Additionally, consumers prefer not to view video commercials and many consumers take active efforts to avoid video commercials by, for example, paying an additional fee for a service that blocks commercials or paying an additional fee for the option to record a video stream and skip the commercials.

Applicant recognizes that marketing efforts may be improved where marketing campaigns are tailored specifically to consumers who are more likely to be interested in the products. Additionally, marketing campaigns are more appreciated by consumers where the advertisements are not disruptive or irritating to the consumer. Applicant herein presents methods, systems, and devices for an integrated marketing service that enables a consumer to view and purchase available products that are similar or equal to items seen within media content. Such products include, for example, clothing worn by actors or sporting professionals in the media content, vehicles within the media content, consumer electronics within the media content, tourism products or services relevant to the location of the media content, and so forth. Such integrated marketing can be exceptionally effective in providing relevant products that the consumer is already considering purchasing and may wish to purchase immediately. Systems, methods, and devices of the disclosure are designed to revolutionize marketing by making it more effective and affordable for merchants and more desirable for consumers by creating a simple and unobtrusive marketing platform utilizing current technology.

In an embodiment, a method for providing integrated marketing is disclosed. The method includes receiving media content comprising a product tag, wherein the product tag comprises an indication of a product merchant and/or a unique identifier for a product. The method includes providing the media content to a consumer account. The method includes receiving an indication that the consumer account has selected the product tag. The method includes directing the consumer account to the product merchant associated with the product tag.

In an embodiment, the above-referenced method further includes receiving an order from the consumer account, wherein the order indicates a purchase, reservation, or intent to purchase a good or service from the product merchant. In an embodiment, the method includes providing an escrow service to place the order and accept compensation or other credit for the order.

In an embodiment, a method for determining a product tag for integrated marketing is disclosed. The method includes receiving media content from a content provider and providing the media content to a first service or network configured to extract a product sub-image from the media content. A first or second service or network, as defined herein, may include a service whereby products displayed on a screen are manually tagged with a product tag or, alternatively, whereby products displayed on a screen may be identified and tagged by a computer network that receives an indication of a product being displayed on the screen. The method includes receiving the product sub-image from the first service or network and providing the product sub-image to a second service or network configured to determine a product type based on the product sub-image. The method includes receiving from the second service or network an indication of the product type associated with the product sub-image. The method includes overlaying a product tag on the media content, wherein the product tag comprises an indication of the product type and a product merchant associated with the product type.

Before the structure, systems, and methods for integrated marketing are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Referring now to the figures, FIG. 1 illustrates a schematic diagram of a system 100 for providing integrated marketing. In an embodiment, the system includes an integrated marketing 102 platform, a content provider 106, and a merchant 110 (may alternatively be referred to as a goods/services provider and may refer to any person or entity operating in commerce). Each of the integrated marketing 102 provider, the content provider 106, and the merchant 110 may communicate over a network 120 such as a cloud computing network. The network 120 may provide media content including product tags to one or more consumer devices such as a computing device 118, a mobile computing device 116, and alternatively a television or any other suitable platform. The integrated marketing platform 102 includes a server and a database 104, wherein the database stores information concerning media content, relevant product tags, product sub-images, product merchants associated with relevant product tags, and so forth. The content provider 106 includes a server and a database 108 for storing media content. The merchant 110 includes a server and a database 112 for storing product information including product metadata, product pricing, media content associated with the products, and so forth.

The integrated marketing 102 platform generates and provides a novel form of integrated marketing to a consumer. In an embodiment, the integrated marketing 102 platform receives media content that includes "product tags" indicating that a product within the media content may be purchased by a consumer. The product tag may offer, for example, an item of clothing for sale that is equal or similar to an item of clothing worn by an actor in the media content, or it may direct a consumer to a local seller of an item within the media content such as a vehicle or consumer electronic device. In various embodiments, the product tag may direct a consumer to the manufacturer or retailer for a particular item, or it may direct a consumer to an auction for the actual copy of the item that is seen in the media content. The product tag may provide a variety of options for sale that are equivalent or similar to the product seen in the media content. For example, where the product is an item of clothing, the product tag may auto populate a list of similar items of clothing from a variety of retailers. Alternatively, the product tag may provide only the exact item of clothing from the same retailer that produced the item within the media content.

In an embodiment where the integrated marketing 102 platform receives media content that already includes product tags, the integrated marketing 102 platform provides the media content to a consumer device 116, 118. In an embodiment, the integrated marketing 102 platform provides the tagged media content to the consumer device 116, 118 only after receiving an affirmative opt-in indicating the consumer wishes to receive tagged media content. In an embodiment, the integrated marketing 102 platform forces a consumer account to view tagged media content unless the consumer account has opted out of viewing tagged media content by, for example, paying an additional subscription fee. The integrated marketing platform 102 receives an indication that the consumer is interested in browsing available products related to a tagged product within the media content, and the integrated marketing platform 102 provides such products. If the consumer is interested in a particular available product, the integrated marketing 102 platform will direct the consumer to the applicable merchant, such as a manufacturer or retailer, that may sell the product to the consumer. The integrated marketing 102 platform may receive compensation from applicable merchants at a variety of stages in the process, depending on the preferences of the contracting parties. For example, the merchant might compensate the integrated marketing 102 service for advertising the merchant's products after a consumer views the product, is redirected to the merchant, purchases an item from the merchant, and so forth.

In an alternative embodiment, the integrated marketing 102 platform may automatically generates the product tags manually or using machine learning (e.g., artificial intelligence). In such an embodiment, the integrated marketing 102 platform receives media content from a content provider 106 and receives product information from a merchant 110 that has opted into the system 100. The integrated marketing 102 platform provides the media content to a first service or network configured to extract sub-images from the media content that include a potential product. An example sub-image may include a vehicle, an item of clothing or footwear, a consumer device, and so forth. The integrated marketing 102 platform provides the media sub-images to a second service or network that is configured to match the product within the media sub-image with one or more actual products that are for sale by a participating merchant 110. If there is a match between the product within the media content and an actual product for sale by a participating merchant 110, the integrated marketing 102 platform will generate a product tag for the media content. The integrated marketing 102 platform overlays the product tag on the media content, where the product tag includes information about the available actual products, the participating merchants selling items similar to the item within the media content, and pricing for the various actual products. The integrated marketing 102 platform provides the media content to a consumer with the product tags overlaid on the media content and provides the consumer the option to purchase items within the media content.

The media content may be provided to the consumer on any suitable platform. Such platforms include live events including sporting events, music events, pay-per-view events, fundraisers and so forth. An additional platform includes online sales such as merchant websites. An additional platform includes movies and/or television that may include product placements. Such movies and/or television may be provided on broadcast television, on subscription services such as Disney+™, Netflix™, Hulu™, other streaming services, on cable subscription services, and so forth. Additionally, media content may be provided through social media where consumers may interact with other persons, view images or videos, and engage directly with merchants.

Figure 2:
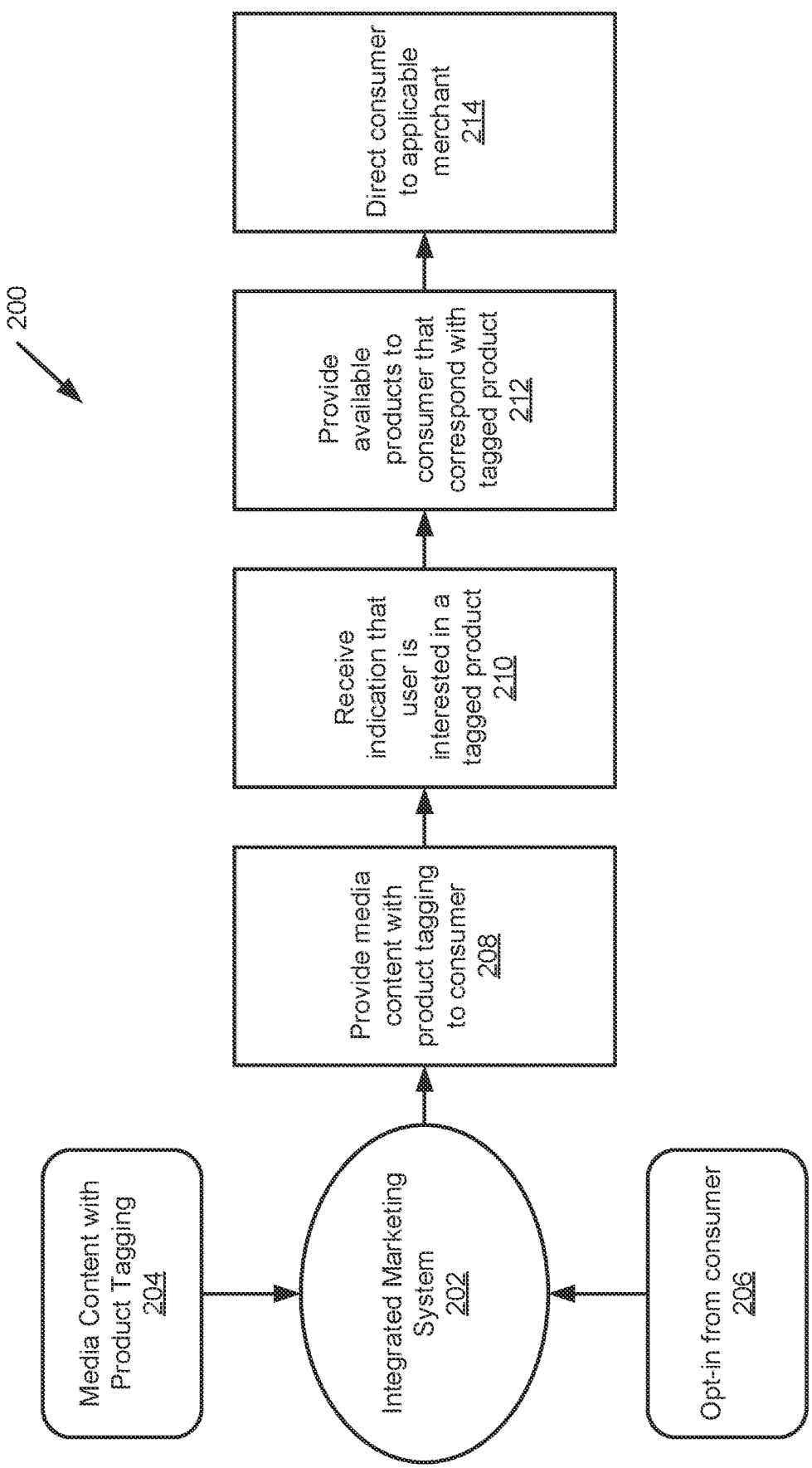
FIG. 2 illustrates a schematic block diagram of a process flow for providing integrated marketing, according to an embodiment of the disclosure.

FIG. 2 illustrates a process flow 200 for generating and providing integrated marketing content. The process flow 200 may be carried out by any suitable computing device, and in one embodiment it is carried about by an integrated marketing system 202. The integrated marketing system 202 receives media content with product tagging 204, and may receive such content from a content provider 106 or a merchant 110, or both. The integrated marketing system 202 receives an opt-in from a consumer 206 where the consumer has passively or affirmatively opted into receiving media content that has been tagged with product information. In various embodiments the consumer might be compensated for viewing tagged media content or might receive a discount on services or goods in exchange for viewing tagged media content. The integrated marketing system 202 provides at 208 the media content with the product tagging to a consumer and receives at 210 an indication that the user is interested in a tagged product. The integrated marketing system 202 provides at 212 available products to the consumer that correspond with or may identically match the tagged product. The integrated marketing system 202, in response to receiving an indication from the consumer that the consumer wishes to learn more about a particular product, provides at 214 an option to purchase, reserve, or save the product within a user interface without redirecting the user to a merchant website or other destination. In an alternative embodiment, the integrated marketing system 202, in response to receiving an indication from the consumer that the consumer wishes to learn more about a particular product, directs that consumer to an applicable merchant.

The integrated marketing system 202 may direct at 214 the consumer to an applicable merchant through various avenues. In an embodiment where a consumer is viewing media content on a web browser, the consumer may be redirected to the merchant's website or a new tab may populate on the consumer's web browser. In an embodiment where a consumer is viewing media content on a television or other device, the consumer may receive a push notification on his mobile computing device 116 that provides an invitation to view the product at the merchant's website. Alternatively, the consumer may purchase the item directly from the integrated marketing system 202 within the web browser, television, or other viewing device without being redirected to the merchant's website. In various alternative embodiments, the consumer may opt-in to receive direct marketing information from the merchant, or the consumer may receive a report of all items the consumer viewed while watching certain media content, or the consumer may receive an email or other communication inviting the consumer to view the item at the merchant's website or a third-party website. Alternatively, the consumer may receive direct contact information for a local retailer where, for example in the instance of a vehicle, the merchant is a local dealer or retailer of the product.

Figure 3:
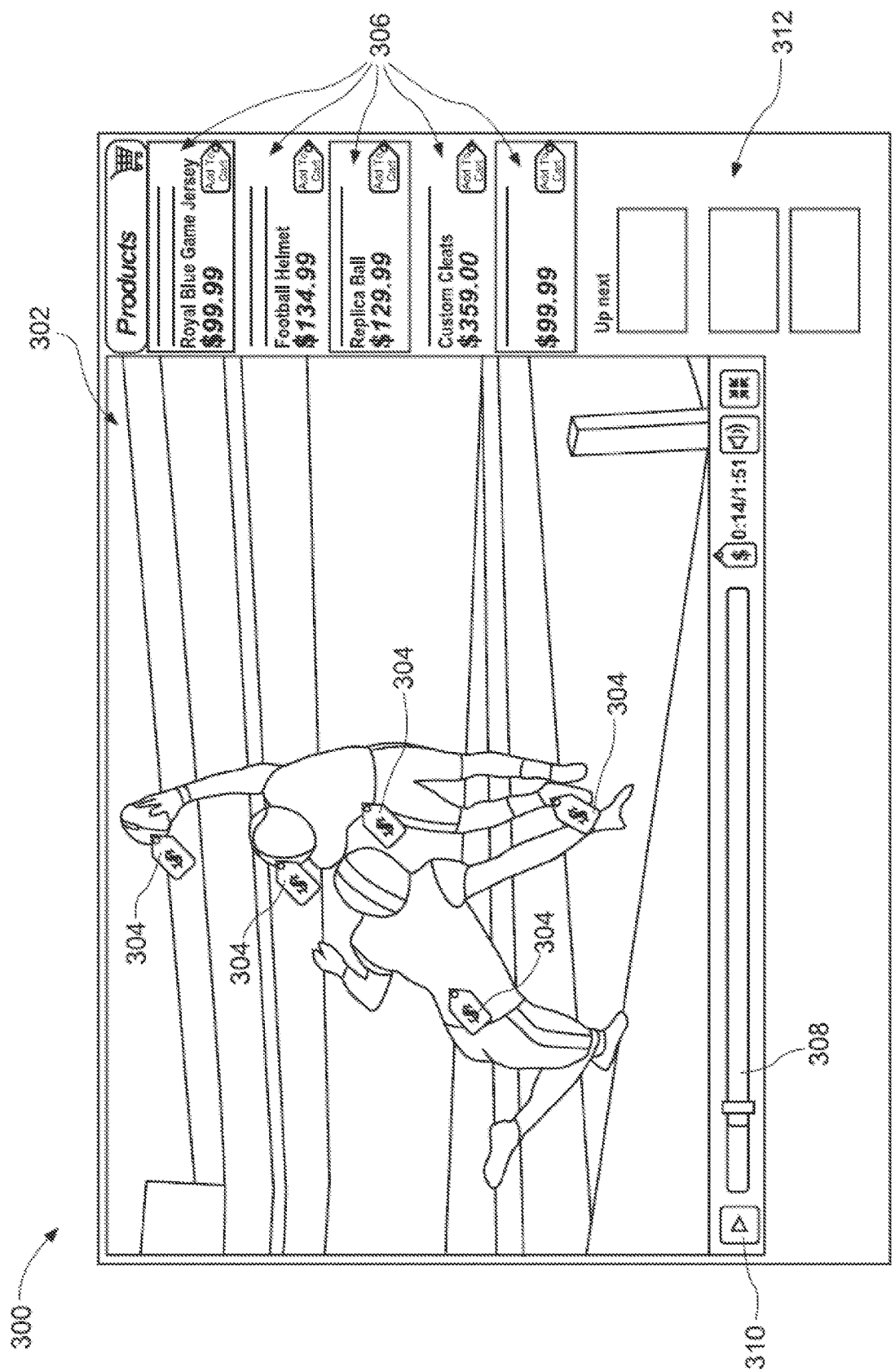
FIG. 3 illustrates a screenshot of a consumer's view of an integrated marketing system, according to an embodiment of the disclosure.
Figure 4:
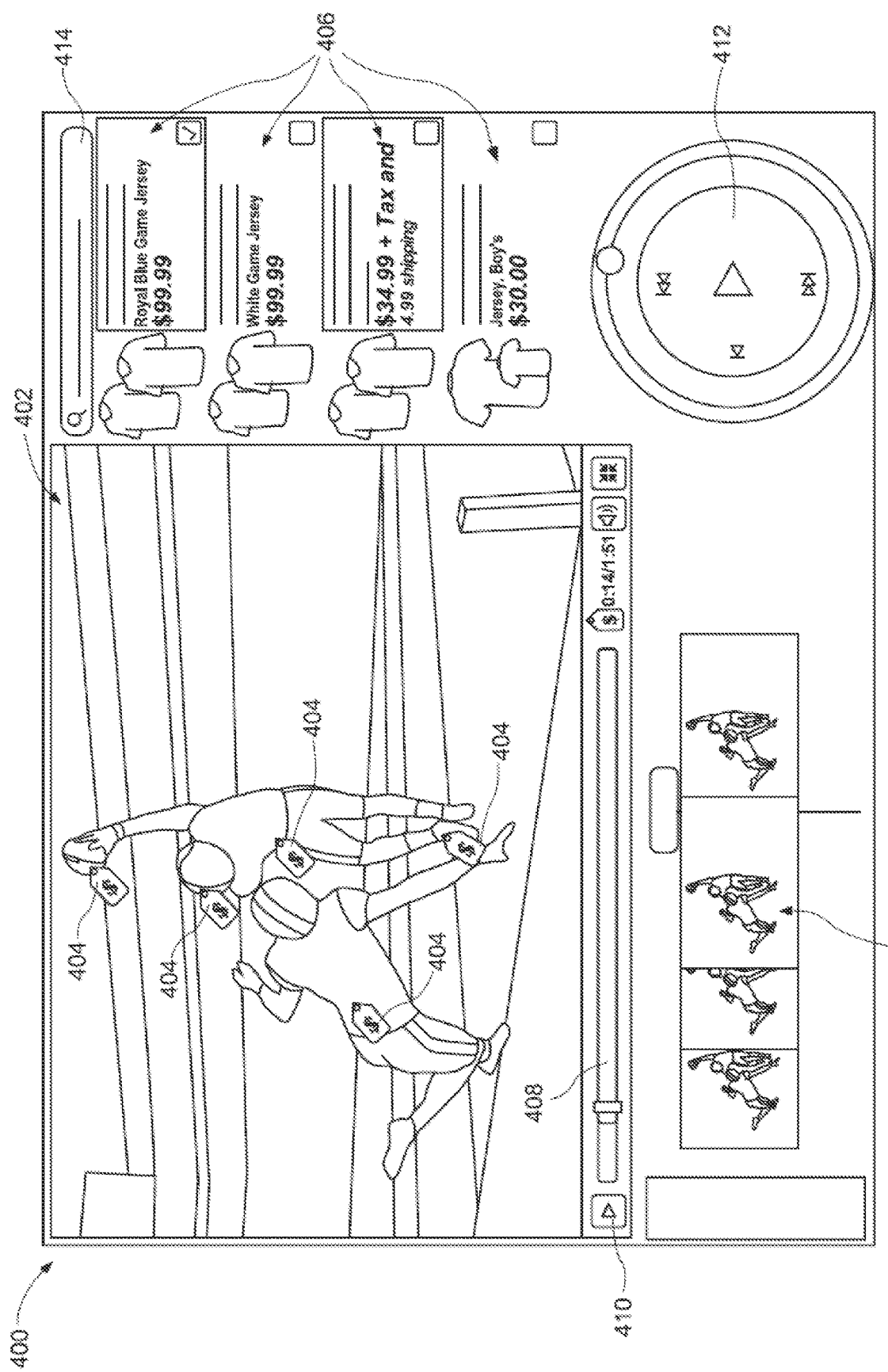
FIG. 4 illustrates a screenshot of a provider's view of an integrated marketing system, according to an embodiment of the disclosure.

FIGS. 3-4 illustrate exemplary screenshots of an embodiment of an integrated marketing platform. FIG. 3 illustrates a consumer's view 300 of the integrated marketing platform and FIG. 4 illustrates an exemplary promoter's view 400 that may be available to a content provider 106, a merchant 110, or the integrated marketing 102 platform.

As illustrated in FIG. 3, the consumer's view 300 of the integrated marketing platform includes media content 302 and product tags 304 that enable a consumer to view and purchase products 306 that are featured in the media content 302. In an embodiment as illustrated in FIG. 3, the consumer's view 300 may be viewable via a web browser. In various embodiments, the consumer's view 300 is viewable through streaming or other services configured to provide image or video content that is viewable on a web browser. Examples of such streaming or other services presently available in the market include YouTube™, Netflix™, Hulu™, Vimeo™, Disney+™ and so forth. Such services may be free and include integrated advertisements or may be provided as a paid subscription service. Alternatively, the media content 302 may be provided in a hard copy format such as Blu-Ray™, digital video disc, or any suitable storage device. Further, the media content 302 may be provided via a broadcasted signal such as a satellite signal, a cable signal, and so forth that may be viewed on a television or other device. In an embodiment, the service may be free or may be provided at a discounted subscription rate if a consumer agrees to receive product tags 304 with the media content 302. In an embodiment, a content provider may integrate product tagging into the program to support sponsors or products that are predetermined to be included in the content.

In an embodiment, the media content 302 is provided live and the product tags 304 are generated as the media content 302 is aired. Product tags 304 may mark one or more products 306 (i.e. goods or services) that may be purchased. The marked product(s) 306 may include a wide variety of products but the function of product tags 304 are substantially similar regardless of the type of product(s) 306 for sale. In such an embodiment, the media content 302 may be provided to a first service or network configured to determine portions of the media content 302 that may include certain products such as, for example, clothing, electronics, vehicles, and may even include offers for similar subscription content, such as access to view all professional football games, instead of just the professional football games televised on broadcast or cable subscription television, access to fantasy sports services, and so forth. In other words, a product, particularly a service product, may also be provided as a marked product 306. The output of the first service or network may be provided to a second service or network configured to determine a match with the one or more products within the media content 302 with available products 306. In such an embodiment, the second service or network may have access to available products 306 that have opted into the system 100. The second service or network may be configured to match the available products 306 with corresponding similar or identical products within the media content 302. A display of products 306 may be located below the media content, beside the media content, or anywhere else in the display, and may further include detailed or simple information concerning products 306 offered in media content 302.

In an embodiment, the media content 302 is prerecorded and is not provided live. The media content 302 may be manually or automatically tagged with the product tags 304 before the media content 302 is provided to a consumer. In an embodiment where a user manually implements the product tags 304, the user may select a product within the media content 302 and provide an indication that the product is similar or identical to an available product 306. The available products 306 may be limited to available products 306 manufactured or sold by retailers that have opted into the system 100. Such retailers may pay for the ability to provide available products 306 for sale that are featured in the media content 302.

In an embodiment, a user may play or pause the media content 302 via a play button 310. The user may additionally fast forward or rewind the media content 302 via a slider 308 integrated in the consumer's view 300. The user may thus skip through media content 302 and/or pause the media content 302 if the user is particularly interested in one or more of the product tags 304 that generate available products 306 for sale. A list of products 306 that were displayed during the media content may be collectively displayed at the end of the media content, be it a program, game, show, movie etc.

In an embodiment, the available products 306 are automatically updated to reflect the product tags 304 in the media content 302 as the media content 302 is played. In various embodiments the user may select an available product 306 and be directed to the retailer providing the product, may receive more information about the product, may elect to be added to a marketing or mailing list for the retailer, and/or may immediately add the product 306 to a virtual shopping cart. The system 100 may save a virtual shopping cart for the user that may include one or more products 306 that are associated with one or more product tags 304 viewed by the user. The virtual shopping cart may include products 306 provided by one or more retailers, manufacturers, persons, and/or other entities (may herein be referred to as merchants or providers). In an embodiment, the virtual shopping cart includes products 306 provided by a plurality of providers, and the products are separated by provider into sub shopping carts with a separate total and/or shipping charge for each provider. In such an embodiment, the shopping cart may be processed through each provider individually within the same system 100 platform. Alternatively, the entire shopping cart may be processed through the system 100 even when products from a plurality of providers are selected.

The consumer's view 300 may further include recommended media content 312. The recommended media content 312 may be determined by an algorithm that considers the consumer's demographics, viewing history, preferences, purchase history, and so forth. In an embodiment, the algorithm determining the recommended media content 312 provides a preference for media content 302 that includes product tags 304 over media content that does not include any product tagging. In an embodiment, the recommended media content 312 includes an indication that the video includes product tags 304. In such an embodiment, a user may elect to view recommended media content 312 that includes product tags 304. In an embodiment, the user may receive a monetary or other benefit for indicating a preference for viewing media content 302 that includes product tags 304.

As illustrated in FIG. 4, the exemplary promoter's view 400 of the integrated marketing platform includes the media content 402, an ability to rewind or forward the media content, and an ability to manually or automatically add or remove product tags 404 and products 406. Product tags 404 may mark one or more products 406 (i.e. goods or services) that may be purchased. The marked product(s) 406 may include a wide variety of products but the function of product tags 404 are substantially similar regardless of the type of product(s) 406 for sale. The promoter's view 400 may be provided to a manufacturer or retailer of a product, a marketing or advertising firm, a content provider, a product provider, a merchant of goods and/or services, a person operating in commerce, an entity providing advertisement content for one or more merchants, and so forth. In an embodiment, a user having access to the promoter's view 400 may view prerecorded or live media content 402 and indicate one or more product tags 404 that should be implemented into the media content 402. The user may further indicate one or more products 406 that are similar or identical to the products associated with the product tags 404 in the media content 402. Similar to the consumer's view 300, a user with access to the promoter's view 400 may pause or play the content with a play button 410 and may fast forward or rewind the media content 402 with a slider 408. Additionally, the promoter's view 400 may provide a content adjuster 412 for simple and easy-to-use adjustment of the media content 402 by playing, pausing, fast forwarding, rewinding, or sliding through the media content 402. The promoter's view 400 may further include a fine-tuning adjustor 416 for fast-forwarding, rewinding, pausing, and viewing the content frame-by-frame or at any suitable speed. The fine-tuning adjustor 416 may permit the user to add product tags 404 to specific frames of the media content 402 by enabling the user to select one or more specific frames in slow motion or at any suitable speed.

The promoter's view 400 may include a search bar 414 for searching a database of suitable products 406 that may be associated with a product tag 404. In an embodiment, a user with access to the promoter's view 400 may search via the search bar 414 to find various products 406 that are similar or identical to an item or product within the media content 402. The user may then create a product tag 404 and associate the one or more products 406 with the product tag 404. The search bar 414 may provide access to products 406 that are stored in one or more of a merchant database 112, a content provider database 108, and/or an integrated marking database 104. The search bar 414 may include various options to filter products 406 such that a user with access to the promoter's view 400 may ensure that the posted available products 406 are in fact similar or identical to items/products viewable within the media content 402.

The available products 306, 406 may include physical products that are currently available for purchase, lease, rent, pre-sale, and so forth. The available products 306, 406 may not be currently available in various embodiments and may not include a physical product. The available products 306, 406 may include an experience such as an activity, a vacation, and so forth and may include an advertisement or invitation to receive more information about, for example, a tourist destination, a hotel, a real property rental or leasing opportunity, and so forth. The available products 306, 406 may include advertisements for businesses, retailers, or service providers such as restaurants, organizations, service providers, brick-and-mortar retailers, online retailers, and so forth. It should be appreciated that a product tag 304, 404 may be attached to an item within the media content 302, 402 even if the product tag 304, 404 is not an exact match with the item. For example, a hotel visible within the media content 302, 402 may include a product tag 304, 404 for one or more hotels at the same destination as the media content, a destination near the user's location, a popular destination, and so forth. Additionally, the available products 306, 406 may provide an opportunity to purchase a product, rent a product, lease a product, receive additional information about a product, join a mailing or marketing list for a product provider, get in contact with a product provider, view additional advertisement or information about a product provider, and so forth. It should be appreciated that the available products 306, 406 may include personal property, real property, experiences, coupons, advertisements, additional information, and so forth. The available products 306, 406 may be directly or indirectly related to the media content 302.

The product tags 304 may default to being visible at all times while the media content 302 is viewed. Alternatively, a user may elect to view the product tags 304 only at certain times or may elect to have the product tags 304 auto-populate within the media content 302 and then automatically disappear after a set amount of time. In various embodiments, a user or provider/merchant may provide benefits to consumers who elect to view product tags 304 along with media content 302. Such benefits include, for example, reduced fees for a paid subscription service, the option to eliminate other advertising content such as video commercials, and/or the ability to receive compensation for viewing media content 302 with product tags 304. It is noted that artificial intelligence may also be used to identify products to be tagged in video content, add the tags, and present the video content including tags.

Figure 5:
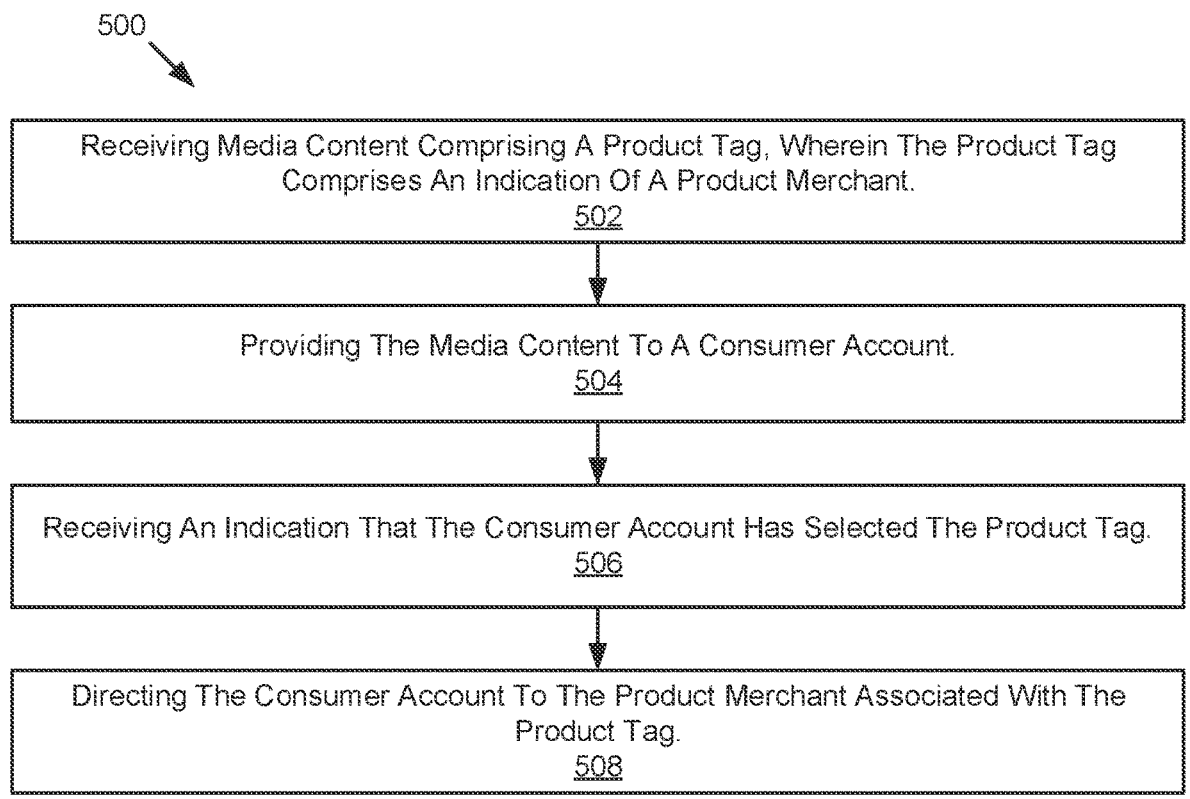
FIG. 5 illustrates a schematic flow chart diagram of a method for providing integrated marketing, according to an embodiment of the disclosure.

FIG. 5 is a schematic flow chart diagram of an example method 500 of providing integrated marketing to a consumer. The method 500 may be completed by any suitable computing device including an integrated marketing 102 system. The method 500 begins and the computing device receives at 502 media content comprising a product tag, wherein the product tag comprises an indication of a product merchant. The computing device provides at 504 the media content to a consumer account and receives at 506 an indication that the consumer account has selected the product tag. The computing device provides at 508 an option to the consumer account to purchase a product associated with the product tag.

Figure 6:
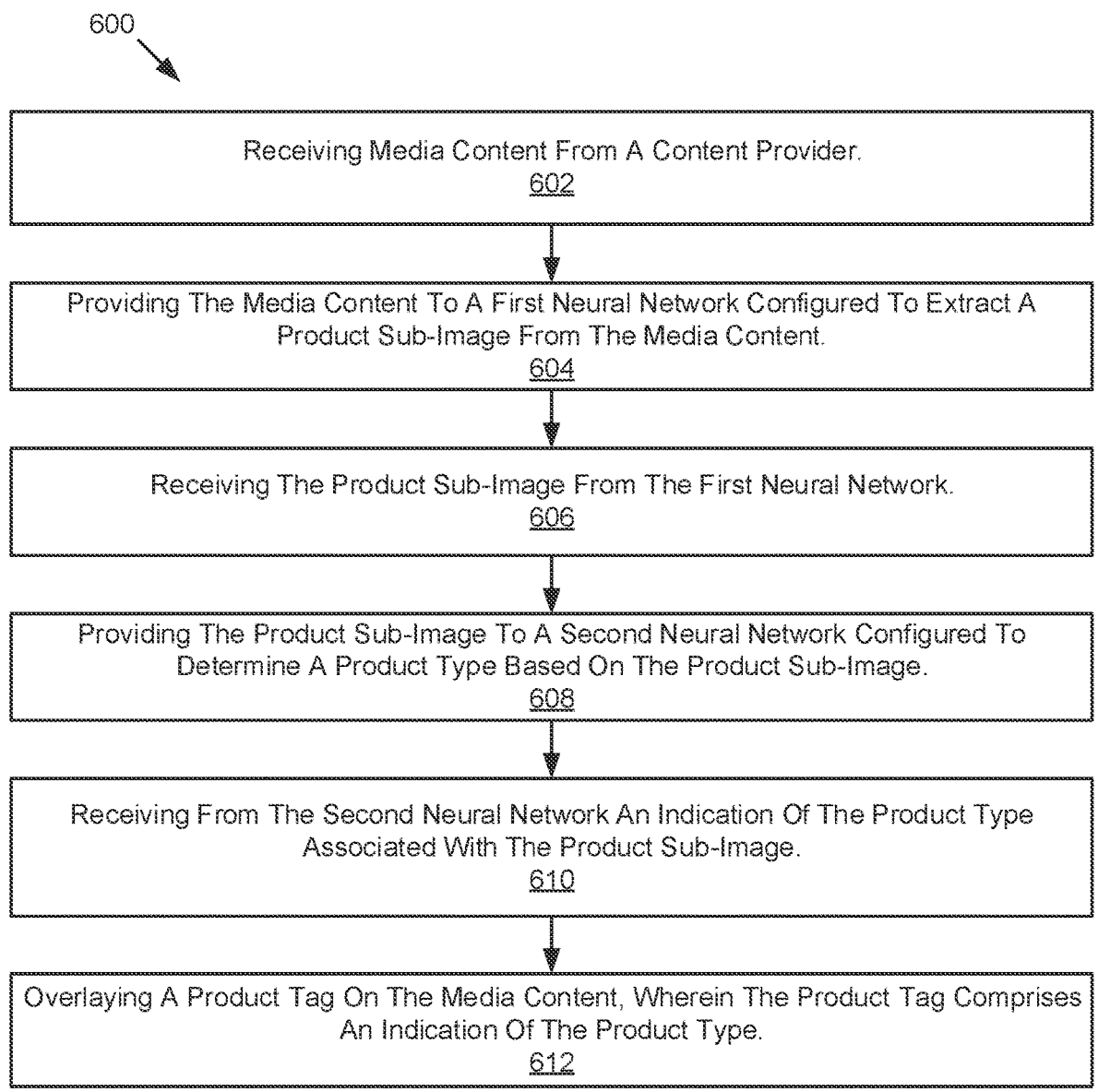
FIG. 6 illustrates a schematic flow chart diagram of a method for providing integrated marketing, according to an embodiment of the disclosure.

FIG. 6 is a schematic flow chart diagram of an example method 600 of providing integrated marketing to a consumer. The method 600 may be completed by any suitable computing device including 102 an integrated marketing system. The method 600 begins as the computing device receives media content from a content provider 602. The computing device provides at 604 the media content to a first service or network (e.g., an artificial intelligence service) configured to extract a product sub-image from the media content and receives at 606 the product sub-image from the first service or network. The computing device provides at 608 the product sub-image to a second service or network configured to determine a product type based on the product sub-image and receives at 610 from the second service or network an indication of the product type associated with the product sub-image. The computing device overlays at 612 a product tag on the media content, wherein the product tag comprises an indication of the product type.

Figure 7:
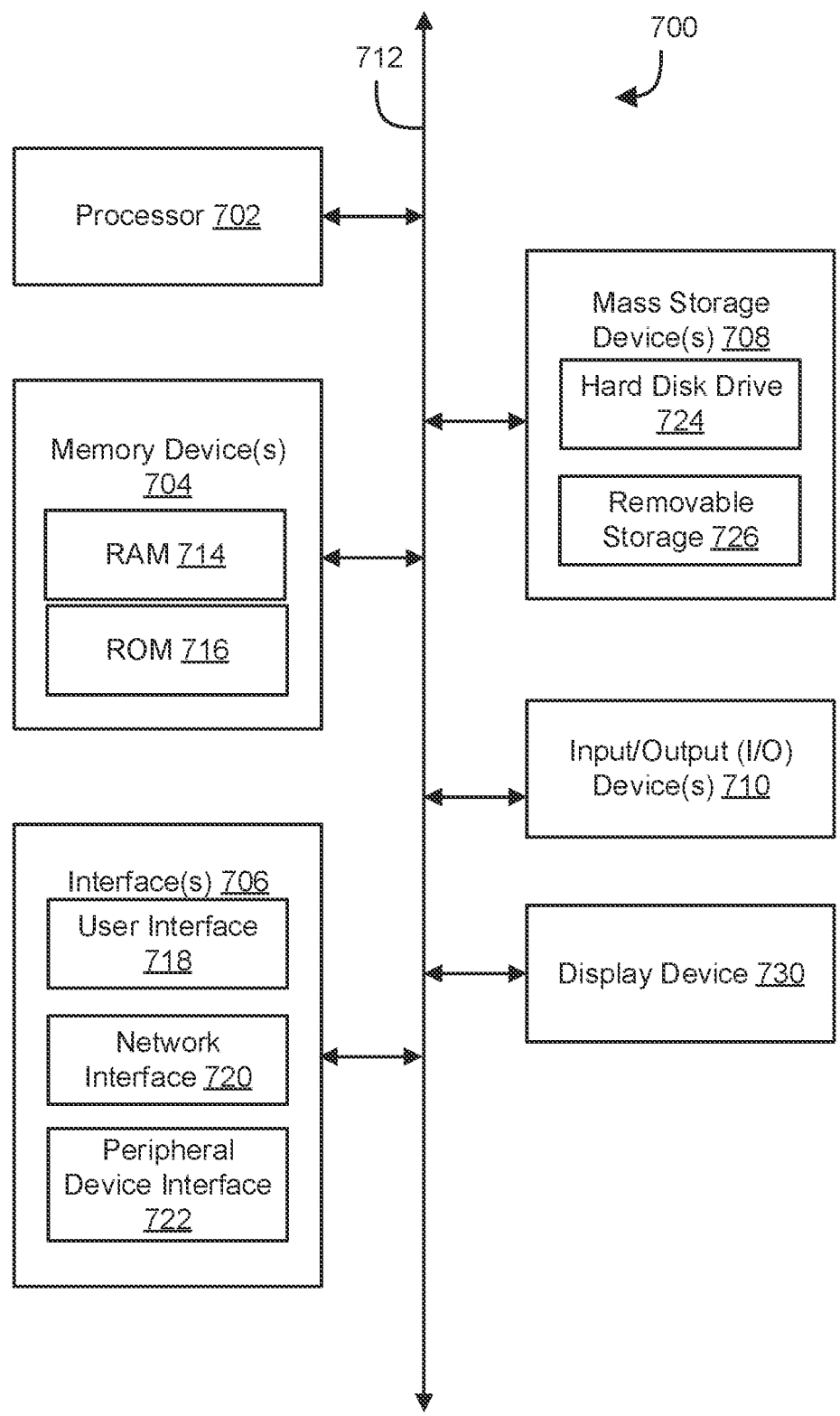
FIG. 7 illustrates an example computing system, according to an embodiment of the disclosure.

Referring now to FIG. 7, a block diagram of an example computing device 700 is illustrated. Computing device 700 may be used to perform various procedures, such as those discussed herein. In one embodiment, the computing device 700 can function as a vehicle controller, a server, and the like. Computing device 700 can perform various monitoring functions as discussed herein, and can execute one or more application programs, such as the application programs or functionality described herein. Computing device 700 can be any of a wide variety of computing devices, such as a desktop computer, in-dash computer, vehicle control system, a notebook computer, a server computer, a handheld computer, tablet computer, smart television, and the like.

Computing device 700 includes one or more processor(s) 702, one or more memory device(s) 704, one or more interface(s) 706, one or more mass storage device(s) 708, one or more Input/output (I/O) device(s) 710, and a display device 730 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 include various computer readable media, such as magnetic tapes, magnetic disks, optical disks, solid-state memory (e.g., Flash memory), and so forth. As shown in FIG. 1, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, wireless or wired remote control devices, and the like.

Display device 730 includes any type of device capable of displaying information to one or more users of computing device 700. Examples of display device 730 include a monitor, display terminal, video projection device, and the like.

Interface(s) 706 include various interfaces that allow computing device 700 to interact with other systems, devices, or computing environments. Example interface(s) 706 may include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more user interface elements 718. The interface(s) 706 may also include one or more peripheral interfaces such as interfaces for printers, pointing devices (mice, track pad, or any suitable user interface now known to those of ordinary skill in the field, or later discovered), keyboards, and the like.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 700 and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method of providing integrated marketing. The method includes receiving media content comprising a product tag, wherein the product tag comprises an indication of a product merchant; providing the media content to a consumer account; receiving an indication that the consumer account has selected the product tag; and directing the consumer account to the product merchant associated with the product tag.

Example 2 is a method as in Example 1, wherein the product tag further comprises an indication of one or more available products corresponding with an item featured in the media content.

Example 3 is a method as in any of Examples 1-2, further comprising overlaying the product tag on the media content.

Example 4 is a method as in any of Examples 1-3, wherein directing the consumer account to the product merchant associated with the product tag comprises one or more of: directing the consumer account to a website of the product merchant, enrolling the consumer account in a direct marketing campaign of the product merchant, or providing the consumer account with a communication of a contact information for the product merchant.

Example 5 is a method of generating integrated marketing. The method includes receiving media content from a content provider; providing the media content to a first service or network configured to extract a product sub-image from the media content; receiving the product sub-image from the first service or network; providing the product sub-image to a second service or network configured to determine a product type based on the product sub-image; receiving from the second service or network an indication of the product type associated with the product sub-image; and overlaying a product tag on the media content, wherein the product tag comprises an indication of the product type and a product merchant associated with the product type.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, televisions, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising:
an integrated marketing computing device comprising at least one processor and at least one memory and further including a platform used to display media content received by a content provider computing device, the integrated marketing computing device configured to:
receive the media content from the content provider computing device, wherein the media content is video content,
receive information about available products from one or more merchant computing devices of one or merchants about potential-products that may be displayed in the media content;
identify one or more products among images displayed within portions of the media content received from the content provider computing device that match the available products received from the one or more merchant computing devices by extracting sub-images from the media content;
receive information from a consumer computing device that includes past behavior of a consumer associated with the consumer computing device and determines recommended media content to provide to the consumer computing device;
automatically generate one or more product tags using machine learning by matching the sub-images from the media content with the available products information, further including determining product types based on the sub-images;
automatically generates an overlay on the media content which includes the one or more product tags automatically generated by the integrated marketing computing device, wherein the one or more product tags are visible tags attached to the one or more identified products displayed within the media content such that both the one or more products and the one or more product tags are visibly displayed on the media content simultaneously and wherein each of the one or more product tags in the overlay include at least the product type, a unique identifier, and an option to purchase the available product associated with the one or more products through interaction with the product tag;
further wherein the media content is video content and the one or more product tags are displayed at a point in the video content corresponding to the one or more products being displayed in the video content;
provide the media content that includes the overlay with the one or more product tags to the consumer computing device for display, wherein the media content with the overlay provided is capable of being paused, played, fast forwarded or rewound at the consumer computing device to view the one or more product tags available in the portions of the video content;
causing the available products associated with the one or more product tags to automatically update in the display of the consumer computing device to reflect the one or more product tags and the one or more products currently in the portions of the video content on the display, wherein the display includes a displayed option to indicate one or more purchase selections of the available products to save to a virtual shopping cart;
receive from the consumer computing device the one or more purchase selections, the selections having been saved to the virtual shopping cart; and
process sale of the selections in the virtual shopping cart, wherein the integrated marketing computing device is capable of processing the sale when the one or more products are from multiple merchants associated with the one or more merchant devices.

2. The system of claim 1, wherein the one or more of the product tags contains an indication of the one or more merchants that is capable of directing the consumer computing device to the one or more merchant computing devices.

3. The system of claim 1, wherein the integrated marketing computing device provides the particular product for purchase to the consumer computing device for display on the consumer computing device.

4. The system of claim 1, wherein the generating of the one or more product tags using machine learning is performed by a neural network.

5. A non-transitory computer readable storage medium containing instructions which when executed by a processor cause the processor to perform a method of displaying media content received by a content provider computing device, the method comprising:
receiving, by an integrated marketing computing device, the media content from the content provider computing device, wherein the media content is video content;
receiving, by the integrated marketing computing device, information about available products from one or more merchant computing devices of one or more merchants about potential products that may be displayed in the media content;
identifying, by the integrated marketing computing device, one or more products among images displayed within portions of the media content received from the content provider computing device that match the available products received from the one or more merchant computing devices by extracting sub-images from the media content;
receiving, by the integrated marketing computing device, information from a consumer computing device that includes past behavior of a consumer associated with a consumer computing device and determines recommended media content to provide to the consumer computing device;
automatically generating, by the integrated marketing computing device, one or more product tags using machine learning by matching the sub-images from the media content with the available products information, further including determining product types based on the sub-images;
automatically generating, by the integrated marketing computing device, an overlay on the media content which includes the one or more product tags automatically generated by the integrated marketing computing device, wherein the one or more product tags are visible tags attached to the one or more identified products displayed within the media content such that both the one or more products and the one or more product tags are visibly displayed on the media content simultaneously and wherein each of the one or more product tags in the overlay include at least the product type, a unique identifier, and an option to purchase the available product associated with the one or more products through interaction with the product tag;

further wherein the media content is video content and the one or more product tags are displayed at a point in the video content corresponding to the one or more products being displayed in the video content;

providing, by the integrated marketing computing device, the media content that includes the overlay with the one or more product tags to the consumer computing device for display, wherein the media content with the overlay provided is capable of being paused, played, fast forwarded or rewound at the consumer computing device to view the one or more product tags available in the portions of the video content;

causing, by the integrated marketing computing device, the available products associated with the one or more product tags to automatically update in the display of the consumer computing device to reflect the one or more product tags and the one or more products currently in the portions of the video content on the display, wherein the display includes a displayed option to indicate one or more purchase selections of the available products to save to a virtual shopping cart;

receiving, by the integrated marketing computing device and from the consumer computing device, the one or more purchase selections, the selections having been saved to the virtual shopping cart; and processing, by the integrated marketing computing device, sale of the selections in the virtual shopping cart when the one or more products are from multiple merchants associated with the one or more merchant devices.

6. The non-transitory computer readable storage medium of claim 5, wherein the identifying of the one or more potential products among the images displayed within portions of the media content is additionally performed manually.

7. The non-transitory computer readable storage medium of claim 5, wherein the generating of the one or more product tags using machine learning is performed by a neural network.

8. A method, comprising:

receiving, by an integrated marketing computing device comprising at least one processor and at least one memory and including a platform used to display media content received by a content provider computing device, media content from the content provider computing device, wherein the media content is video content;

receiving, by the integrated marketing computing device, information about available products from one or more merchant computing devices of one or more merchants about potential products that may be displayed in the media content;

identifying, by the integrated marketing computing device, one or more products among images displayed within portions of the media content received from the content provider computing device that match the available products received from the one or more merchant computing devices by extracting sub-images from the media content;

receiving, by the integrated marketing computing device, information from a consumer computing device that includes past behavior of a consumer associated with a consumer computing device and determines recommended media content to provide to the consumer computing device;

automatically generating, by the integrated marketing computing device, one or more product tags using machine learning by matching the sub-images from the media content with the available products information, further including determining product types based on the sub-images automatically generating, by the integrated marketing computing device, an overlay on the media content which includes the one or more product tags automatically generated by the integrated marketing computing device, wherein the one or more product tags are visible tags attached to the one or more identified products displayed within the media content such that both the one or more products and the one or more product tags are visibly displayed on the media content simultaneously and wherein each of the one or more product tags in the overlay include at least the product type, a unique identifier, and an option to purchase the available product associated with the one or more products through interaction with the product tag;

further wherein the media content is video content and the one or more product tags are displayed at a point in the video content corresponding to the one or more products being displayed in the video content;

providing, by the integrated marketing computing device, the media content that includes the overlay with the one or more product tags to the consumer computing device for display, wherein the media content with the overlay provided is capable of being paused, played, fast forwarded, or rewound at the consumer computing device to view the one or more product tags available in the portions of the video content;

causing, by the integrated marketing computing device, the available products associated with the one or more product tags to automatically update in the display of the consumer computing device to reflect the one or more product tags and the one or more products currently in the portions of the video content on the display, wherein the display includes a displayed option to indicate one or more purchase selections of the available products to save to a virtual shopping cart;

receiving, by the integrated marketing computing device and from the consumer computing device, the one or more purchase selections, the selections having been saved to the virtual shopping cart; and processing, by the integrated marketing computing device, sale of the selections in the virtual shopping cart when the one or more products are from multiple merchants associated with the one or more merchant devices.

9. The method of claim 8, wherein the identifying of the one or more potential products among the images displayed within portions of the media content is additionally performed manually.

* * * * *